Patent text 3,117,280
TIMING SIGNAL RECEIVER
Winslow Palmer, Amityville, N.Y., assignor to Sperry Rand Corporation, Great Neck, N.Y., a corporation of Delaware
Filed Apr. 17, 1962, Ser. No. 188,122
9 Claims. (Cl. 325—351)

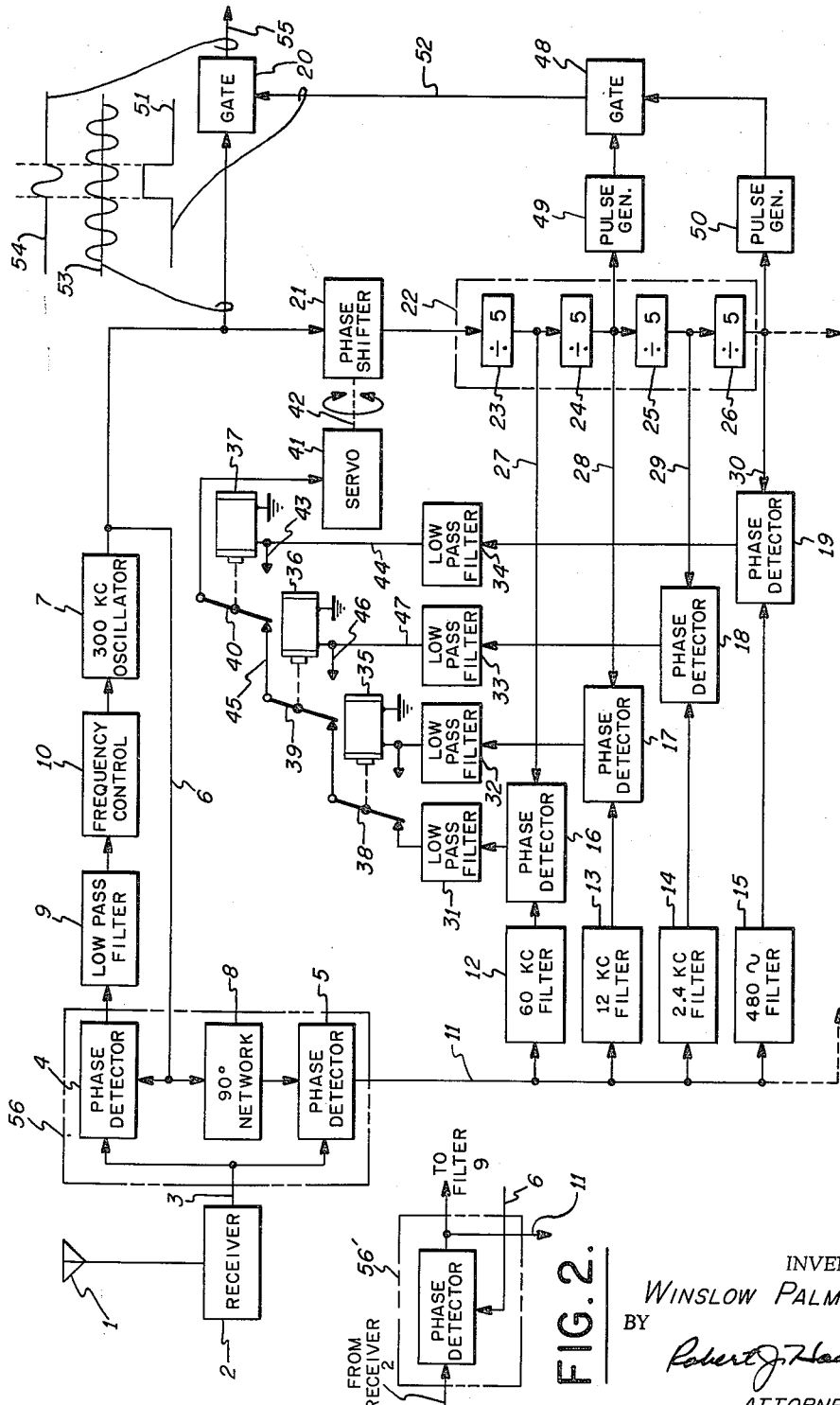
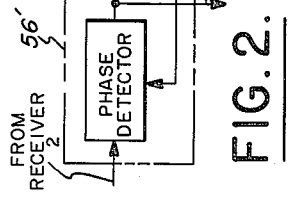

This invention generally relates to timing signal receivers and, more particularly, to a receiver for producing highly precise time marking signals coincident with each of widely separated series of designated carrier cycles of a received continuous wave signal.

The need for the communication of high accuracy time marking signals of low repetition rate has been intensified by the rapid advance of space technology. For example, it has been proposed to transmit such timing signal data over extended ranges to synchronize remotely situated tracking stations which continuously monitor the position and movement of space vehicles based upon the observation of additional timing signal data received from the vehicles. The precise computation of space vehicle position requires that the tracking signal data obtained at the widely separated ground receiving stations be extremely accurately correlated in time in accordance with the synchronizing signal data. The synchronizing signal data as well as the tracking signal data are provided by time marking signals which are detected at each of the stations.

The long distances between the individual tracking stations and the space vehicles necessitates that the precise time marking signals recur over a relatively long repetitive interval in order to avoid timing ambiguities. The extended distances involved also imposes severe signal detection conditions at each of the tracking station receivers. It becomes imperative, for example, that the space vehicle transmit and the tracking receivers respond to continuous wave signal information (to maximize the average received power) and that said receivers employ signal detecting techniques providing a maximum signal to noise ratio.

It is the principal object of the present invention to provide a timing signal receiver for producing highly precise time marking signals of low repetition rate in response to a received continuous wave signal.

Another object is to provide a receiver for producing highly precise time marking signals coincident with each of widely separated series of designated carrier cycles of a received continuous wave signal.

A further object is to provide a reeciver characterized by coherent detection techniques for producing highly precise time marking signals of low repetition rate in response to a received continuous wave signal.

These and other objects of the present invention, as will appear from a reading of the following specification are accomplished in a preferred embodiment by the provision of a timing signal receiver adapted to respond to a continuous wave carrier signal modulated by a plurality of coherent harmonically related modulating signals. The receiver includes a controllable local oscillator coupled via a variable phase shifter to a frequency divider chain. The oscillator and divider chain produce coherent reference signals having the same frequencies as the carrier and the modulated signal components of the received signal. Coherent carrier signal detection apparatus is provided to phase lock the local oscillator to the carrier of the received signal and to extract the modulating signal components thereof. Each of the extracted signal components is applied to a respective phase detector wherein it is phase compared with a corresponding frequency locally generated signal provided by the divider chain. Each phase detector produces an output or error signal having an amplitude and polarity representing the degree and sense of the phase error between the respective applied input signals.

The phase detector error signals are applied to a logical decision network which is adapted to select the error signal from the lowest frequency phase detector to control the phase of the aforementioned variable phase shifter. The error signal drives the phase shifter in servo fashion in a direction and by an amount to reduce the error signal toward zero. As the phase error output signal from the lowest frequency detector reduces towards zero, the decision network transfers control of the phase shifter to the next higher frequency phase detector, and so on, until all of the phase error signals from all of the phase detectors have been reduced toward zero. At this point, each of the coherent harmonically related divider chain output signals is phase matched to its corresponding modulating frequency component of the received signal whereupon all of the timing precision of the received signal has been transferred to the locally generated signals.

The phase locked local signals are then combined to produce a sampling trigger having a recurrence rate determined by the lowest frequency modulating signal component of the received signal and an accuracy determined by the accuracy of the highest frequency modulating signal component. The resulting sampling trigger selects a particular cycle of the local oscillator output signal to provide an output time marking signal having a repetition interval equal to that of said lowest frequency component and a time-position accuracy equal to that of the carrier of the received signals.

For a more complete understanding of the present invention, reference should be had to the following specification and to the appended figures of which:

FIG. 1 is a simplified diagram of a typical embodiment of the present invention adapted to receive an amplitude modulated continuous wave signal; and FIG. 2 is a simplified block representation of a signal detection circuit which may be substituted in FIG. 1 for the case of a frequency modulated continuous wave received signal.

Referring to FIG. 1, a continuous wave signal modulated by a plurality of coherent harmonically related modulating signals is received by antenna 1 and processed in receiver 2. The signal processing accomplished in receiver 2 is determined by the nature of the modulated signal received by antenna 1. For example, the received signal may be a continuous wave carrier signal amplitude modulated by a plurality of coherent harmonically related modulating signals. In that case, receiver 2 merely amplifies the received signal. Alternatively, the multiple amplitude modulated carrier signal conveying the timing data might be actually a subcarrier of a higher frequency complex modulated signal. The amplitude modulated subcarrier might, in turn, frequency modulate the higher frequency primary carrier. In the latter case, receiver 2 would function in a conventional manner to demodulate the primary carrier signal received by antenna 1 to produce on line 3 the amplitude modulated subcarrier signal. As will be seen later, the plurality of coherent modulating signals may amplitude modulate or frequency modulate said subcarrier. The present invention is equally applicable to any of the aforementioned conventional modulation techniques. For the sake of simplicity and clarity of exposition, however, it is first assumed that a continuous wave carrier signal amplitude modulated by a plurality of coherent harmonically related modulating signals is received by antenna 1 and amplified by receiver 2. More particularly, a representative case will be described in which the continuous wave carrier frequency is 300 kc. and that the carrier signal is simultaneously amplitude modulated by each of 4 coherent harmonically related modulating signals at 60 kc., 12 kc., 2.4 kc. and 480 c.p.s., respectively.

The multiple amplitude modulated signal at the output of receiver 2 is jointly applied to phase detectors 4 and 5. Detector 4 is driven by the 300 kc. reference signal produced on line 6 at the output of oscillator 7. The reference signal of line 6 is also applied to phase detector 5 via 90 degree phase shifting network 8. A direct current component is produced in the signal at the output of detector 4 representing the phase error between the carrier signal at the output of receiver 3 and the reference signal produced on line 6. Said direct current component is extracted in low pass filter 9 and is applied by a frequency control 10, such as a reactance tube, to control the frequency and phase of oscillator 7. Oscillator 7 is controlled in a conventional manner by the automatic frequency control loop comprising detector 4, filter 9, frequency control 10, oscillator 7 and line 6 to bring the phase of the signal on line 6 into a quadrature phase relationship with the carrier of the modulated signal at the output of receiver 3. Thus, oscillator 7 is phase locked to the carrier of the received signal.

The phase locked signal on line 6 is phase shifted into an in-phase relationship with the received carrier by network 8. Said in-phase relationship obtains at the inputs to phase detector 5 whereby detector 5 operates as a coherent amplitude demodulator to produce on line 11 the plurality of modulating signals imposed on the received carrier signal. The detected signals on line 11 are jointly applied to the individually tuned band pass filters 12, 13, 14 and 15. Each filter passes the respective one of the detected modulating signals to which it is tuned and applies the same to a corresponding one of the phase detectors 16, 17, 18 and 19.

It should be noted that four modulating frequencies have been assumed for the sake of exemplification. However, the accuracy and ambiguity resolution desired in a particular application of the timing receiver of the present invention might dictate the use of a greater or smaller number of modulating frequencies. For example, for a given ambiguity resolution, the number of modulating frequencies required increases with an increase of desired accuracy, said accuracy varying directly with the frequency of the carrier signal as will be seen more fully later.

The 300 kc. signal of oscillator 7 also is applied to gate 20 and, via electromechanical phase shifter 21 to the input of divider chain 22 comprising conventional frequency dividing stages 23, 24, 25 and 26 connected in cascade. The signals appearing on lines 27, 28, 29 and 30 at the outputs of cascaded stages are at the respective frequencies of 60 kc., 12 kc., 2.4 kc. and 480 c.p.s. It should be noted that the reference signals generated on lines 27–30 are coherent and harmonically related to each other and to the signal produced by oscillator 7 in the same manner that the detected modulating signals on line 11 are coherent and harmonically related to each other and to the carrier signal of the received wave. The locally generated signals are applied to respective phase detectors 16–19.

Each of the phase detectors 16–19 produces an output direct current signal representing the phase departure between the two input signals applied thereto. Said direct component is extracted by a respective one of low pass filters 31, 32, 33, and 34. In addition to passing the desired direct component, each of the low pass filters 31–34 in combination with its respective phase detector acts as an extremely narrow band pass filter centered about the frequency of the corresponding modulating signal appearing on line 11 to substantially reject noise components that may be present in the received signal.

The signals passed by filters 32–34 energize respective relay windings 35, 36 and 37. Each relay includes a pair of contacts and a moveable arm comprising a single pole double throw switch actuated by the relay coil. Moveable arms 38, 39 and 40 assume the positions shown when the respective coils are de-energized. The signal appearing at arm 40 is applied to servo 41 to control the angular position of shaft 42 of phase shifter 21 in a manner to be described later. The signal appearing at arm 40 is the signal at the output of that one of the filters 31–34 which is coupled to the lowest frequency phase detector producing an output error signal exceeding a predetermined threshold value. Said threshold value is determined by the minimum signal required to actuate the associated one of the relay windings 35–37.

In operation, it is assumed that the local oscillator signal produced by oscillator 7 has been phase locked by the action of the automatic frequency control loop to the carrier of the received signal but that complete phase alignment between the modulating signal components of the received signal and the locally generated signals provided by the divider chain 22 has not yet been achieved. In this case, an output error signal is produced by each of phase detectors 16–19, detector 19 being designated the lowest frequency phase detector because of the 480 c.p.s. signals applied thereto. The direct component of the error signal output of detector 19 is applied by filter 34 to energize relay winding 37. Arm 40 is actuated to connect with contact 43 and apply the signal on line 44 directly to servo 41. Servo 41 is driven in a sense and by an amount determined by the signal on line 44 to simultaneously vary the phase of all the signals produced on lines 27–30 until the signal on line 30 is brought to a phase quadrature relationship with the signal passed by the filter 15. Upon the achievement of said phase quadrature relationship, the output signal produced on phase detector 19 reduces toward zero, de-energizing relay winding 37.

Upon the de-energization of winding 37, arm 40 is deactuated to connect with contact 45. Relay winding 36 continues to be energized by the output of detector 18 whereby arm 39 is actuated to connect with contact 46. Thus, the error signal appearing on line 47 at the output of filter 33 is directly applied via actuated arm 39 and deactuated arm 40 to servo 41. Servo 41 is controlled in a manner similar to that described previously to more accurately control the phase of the divider chain signal of lines 27–30 to bring the signal on line 29 into a more precise phase quadrature relationship at detector 18 with the signal passed by filter 14. Upon the establishment of said quadrature relationship, the error signal produced by phase detector 18 reduces to zero with the consequent de-energization of relay winding 36.

It can be seen that the above sequence of operations repeats anew with the control of servo 41 being transferred successively from the output of phase detector 18 to the output of detector 17 and finally to the output of detector 16. In each case, control of servo 41 is maintained by the lowest frequency phase detector producing at least a predetermined threshold value of output error signal. As the output signal falls below said value, control of servo 41 is transferred to the next higher frequency phase detector and so on until all of the phase detector signals have fallen below the predetermined value whereupon arms 38–40 assume the positions shown in FIG. 1. It can be seen that the sequence of relay operations is in effect a succession of ambiguity elimination steps whereby the signal of oscillator 7 is brought into phase alignment with the carrier of the received modulated signal with an ambiguity resolution factor determined by the frequency of the lowest modulating signal, namely, 480 c.p.s.

Now that the locally generated signals have been phase aligned with their corresponding carrier and modulating signal components of the received wave whereby the locally generated signals take on the timing precision of the received wave, it remains to combine the locally generated signals to produce the ultimately desired time marking signal. This is accomplished with the aid of gates 20 and 48. The sinusoidal signals at the outputs of frequency divider stages 24 and 26 are applied by pulse generators 49 and 50, respectively, to gates 48. Each pulse generator is arranged in a conventional manner to produce an output pulse synchronously with the alternate crossover points of the applied sinusoidal signal. Gate 48 produces pulse 51 on line 52 having a recurrence rate of 480 c.p.s. and a timing precision determined by that of the synchronized 12 kc. signal at the output of divider 24. Pulse 51 and the 300 kc. signal 53 of oscillator 7 are jointly applied to gate 20. Gate 20 produces the output signal 54 on line 55 having a recurrence rate of 480 c.p.s. and the full timing precision of the phase locked 300 kc. local oscillator signal.

It will be seen from the preceding specification that the objects of the invention have been achieved by the provision of a timing signal receiver in which a high precision time marking signal of low repetitive rate is obtained by matching a set of coherent and harmonically related local reference signals to the corresponding modulating frequency components of a received continuous wave signal. The received is particularly adapted by the use of coherent demodulation techniques to achieve a maximum detected signal-to-noise ratio. Although the described embodiment deals with a continuous carrier wave which is amplitude modulated by a plurality of harmonically related signals, the invention is readily adapted to respond to a continuous wave carrier signal which is frequency modulated by such signals. In the latter case, the previously described receiver detection apparatus indicated by the dotted block 56 of FIG. 1 may be replaced by the correspondingly designated block 56' of FIG. 2. In any event, the carrier modulating signals will be produced on line 11 for application to band-pass filters 12–15.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A timing signal receiver adapted to receive a continuous carrier signal modulated by a plurality of modulating signals coherently related in frequency to each other and to said carrier signal, said receiver comprising
   a local oscillator,
   means including coherent detection means for phase locking said local oscillator with said carrier signal and for deriving said modulating signals from said modulated carrier signal,
   a plurality of phase detectors,
   a plurality of filters tuned to pass respective frequencies of said modulating signals for applying the derived modulating signals to said phase detectors,
   a frequency divider chain,
   controllable phase shifting means for coupling said oscillator to said divider chain,
   said divider chain producing a plurality of local signals at the same frequencies as said modulating signals, said local signals being applied to corresponding frequency ones of said phase detectors,
   and means for applying to said controllable phase shifting means the error signal output of the lowest frequency phase detector producing an error signal exceeding a predetermined value.

2. A timing signal receiver as defined in claim 1 wherein said continuous carrier signal is amplitude modulated by said plurality of modulating signals.

3. A timing signal receiver as defined in claim 1 wherein said continuous carrier signal is frequency modulated by said plurality of modulating signals.

4. A timing signal receiver adapted to receive a continuous carrier signal modulated by a plurality of modulating signals coherently and harmonically related to each other and to said carrier signal, said receiver comprising
   a local oscillator,
   means including coherent detection means for phase locking said local oscillator with said carrier signal and for deriving said modulating signals from said modulated carrier signal,
   a plurality of phase detectors,
   a plurality of band pass filters tuned to respective frequencies of said modulating signals for applying the derived modulating signals to said phase detectors,
   a frequency divider chain,
   controllable phase shifting means for coupling said oscillator to said divider chain,
   said divider chain producing a plurality of local signals at the same frequencies as said modulating signals, said local signals being applied to corresponding frequency ones of said phase detectors,
   and means for applying to said controllable phase shifting means the error signal output of the lowest frequency phase detector producing an error signal exceeding a predetermined value.

5. Receiver means adapted to receive a continuous carrier signal modulated by a plurality of modulating signals coherently related in frequency to each other and to said carrier signal, said receiver means comprising
   a local oscillator,
   means including coherent detection means for phase locking said local oscillator with said carrier signals and for deriving said modulating signals from said modulated carrier signal,
   a plurality of phase detectors,
   a plurality of filters tuned to pass respective frequencies of said modulating signals for applying the derived modulating signals to said phase detectors,
   a frequency divider chain,
   controllable phase shifting means for coupling said oscillator to said divider chain,
   said divider chain producing a plurality of local signals at the same frequencies as said modulating signals, said local signals being applied to corresponding frequency ones of said phase detectors,
   means for applying to said controllable phase shifting means the error signal output of the lowest frequency phase detector producing an error signal exceeding a predetermined value, and
   gating means connected to receive said local signals and an output signal of said local oscillator to produce therefrom a time marking signal having the timing precision of said output signal and a recurrence rate equal to that of the lowest frequency one of said modulating signals.

6. A timing signal receiver adapted to receive a continuous carrier signal amplitude modulated by a plurality of modulating signals coherently and harmonically related to each other and to said carrier signal, said receiver comprising
   a local oscillator,
   means including phase detection means for phase locking said local oscillator with said carrier signal and for deriving said modulating signals from said amplitude modulated carrier signal,
   a plurality of phase detectors,
   a plurality of band pass filters tuned to respective frequencies of said modulating signals for applying the derived modulating signals to said phase detectors,
   a frequency divider chain,
   controllable phase shifting means for coupling said oscillator to said divider chain,
   said divider chain producing a plurality of local signals at the same frequencies as said modulating signals, said local signals being applied to corresponding frequency ones of said phase detectors,
   and switching means for applying to said controllable phase shifting means the error signal output of the lowest frequency phase detector producing an error signal exceeding a predetermined value.

7. A timing signal receiver adapted to receive a continuous carrier signal frequency modulated by a plurality of modulating signals coherently and harmonically related to each other and to said carrier signal, said receiver comprising a local oscillator, means including a first phase detector for phase locking said local oscillator with said carrier signal and for deriving said modulating signals from said frequency modulated carrier signal, a plurality of second phase detectors, a plurality of band pass filters tuned to respective frequencies of said modulating signals for applying the derived modulating signals to said second phase detectors, a frequency divider chain, controllable phase shifting means for coupling said oscillator to said divider chain, said divider chain producing a plurality of local signals at the same frequencies as said modulating signals, said local signals being applied to corresponding frequency ones of said second phase detectors, and means for applying to said controllable phase shifting means the error signal output of the lowest frefrequency second phase detector producing an error signal exceeding a predetermined value.

8. Receiver means adapted to receive a continuous carrier signal amplitude modulated by a plurality of modulating signals coherently and harmonically related to each other and to said carrier signal, said receiver means comprising a local oscillator, means including phase detection means for phase locking said local oscillator with said carrier signal and for deriving said modulating signals from said amplitude modulated carrier signal, a plurality of phase detectors, a plurality of band pass filters tuned to respective frequencies of said modulating signals for applying the derived modulating signals to said phase detectors, a frequency divider chain, controllable phase shifting means for coupling said oscillator to said divider chain, said divider chain producing a plurality of local signals at the same frequencies as said modulating signals, said local signals being applied to corersponding frequency ones of said phase detectors, means for applying to said controllable phase shifting means the error signal output of the lowest frequency phase detector producing an error signal exceeding a predetermined value, and gating means connected to receive said local signals and the output signal of said local oscillator to produce therefrom a time marking signal having the timing precision of said output signal and a recurrence rate equal to that of the lowest frequency one of said modulating signals.

9. Receiver means adapted to receive a continuous carrier signal frequency modulated by a plurality of modulating signals coherently and harmonically related to each other and to said carrier signal, said receiver comprising a local oscillator, means including a first phase detector for phase locking said local oscillator with said carrier signal and for deriving said modulating signals from said frequency modulated carrier signal, a plurality of second phase detectors, a plurality of band pass filters tuned to respective frequencies of said modulating signals for applying the derived modulating signals to said second phase detectors, a frequency divider chain, controllable phase shifting means for coupling said oscillator to said divider chain, said divider chain producing a plurality of local signals at the same frequencies as said modulating signals, said local signals being applied to corresponding frequency ones of said second phase detectors, means for applying to said controllable phase shifting means the error signal output of the lowest frequency second phase detector producing an error signal exceeding a predetermined value, and gating means connected to receive said local signals and the output signal of said local oscillator to produce therefrom a time marking signal having the timing precision of said output signal and a recurrence rate equal to that of the lowest frequency one of said modulating signals.

No references cited.